(12) United States Patent
Mekkattuparamban et al.

(10) Patent No.: US 9,825,814 B2
(45) Date of Patent: Nov. 21, 2017

(54) DYNAMIC ATTRIBUTE BASED APPLICATION POLICY

(71) Applicant: Cisco Technology, Inc., San Jose, CA (US)

(72) Inventors: Joji Thomas Mekkattuparamban, Cupertino, CA (US); Vijay Chander, San Ramon, CA (US); Saurabh Jain, Sunnyvale, CA (US); Van Lieu, San Francisco, CA (US); Badhri Madabusi Vijayaraghavan, Sunnyvale, CA (US); Praveen Jain, San Jose, CA (US); Munish Mehta, Fremont, CA (US); Michael R. Smith, San Jose, CA (US); Narender Enduri, Cupertino, CA (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 38 days.

(21) Appl. No.: 14/809,971

(22) Filed: Jul. 27, 2015

(65) Prior Publication Data

US 2016/0352576 A1    Dec. 1, 2016

Related U.S. Application Data

(60) Provisional application No. 62/167,717, filed on May 28, 2015.

(51) Int. Cl.
  *H04L 12/24* (2006.01)
  *H04L 29/06* (2006.01)
  *H04L 29/12* (2006.01)

(52) U.S. Cl.
  CPC ...... *H04L 41/0893* (2013.01); *H04L 41/0886* (2013.01); *H04L 63/101* (2013.01);
  (Continued)

(58) Field of Classification Search
  USPC .................................................. 709/223, 224
  See application file for complete search history.

(56) References Cited

U.S. PATENT DOCUMENTS 6,629,120 B1 *  9/2003  Walster ............... G06F 7/49989
                                              708/503
6,658,444 B1 * 12/2003  Walster .................. G06F 7/535
                                              708/504

(Continued)

FOREIGN PATENT DOCUMENTS

GB       2520532 A     5/2015
WO    2006115999 A2   11/2006
WO    2009133419 A1   11/2009

OTHER PUBLICATIONS

International Search Report and Written Opinion dated Aug. 31, 2016 for corresponding PCT Application No. PCT/US2016/034697.

*Primary Examiner* — Jude Jean Gilles
(74) *Attorney, Agent, or Firm* — Polsinelli PC

(57) ABSTRACT

Systems, methods, and computer-readable storage media are provided for dynamically setting an end point group for an end point. An endpoint can be assigned a default end point group when added to a network. For example, the default end point group can be a baseline port/security group which is considered an untrusted group. The end point can then be dynamically assigned an end point group based on a set of group selection rules. For example, the group selection rules can identify an end point group based on the MAC address or other attributes. When the end point is added to the network, the MAC address and/or other attributes of the end point can be determined and used to assign an end point group. As another example, an end point group can be assigned based on the amount of traffic or guest operation system.

20 Claims, 6 Drawing Sheets

(52) U.S. Cl.
CPC .......... *H04L 61/15* (2013.01); *H04L 61/6022* (2013.01); *H04L 63/104* (2013.01)

(56) References Cited

U.S. PATENT DOCUMENTS

| | | | | |
|---|---|---|---|---|
| 7,653,747 | B2* | 1/2010 | Lucco | H04L 29/12066 709/203 |
| 7,787,447 | B1* | 8/2010 | Egan | H04L 41/0823 370/252 |
| 7,808,979 | B2* | 10/2010 | Parker | H04L 49/351 370/353 |
| 8,832,175 | B2* | 9/2014 | du Preez | G06F 8/65 709/201 |
| 2003/0051192 | A1* | 3/2003 | Pillay | G01R 31/31701 714/39 |
| 2003/0093702 | A1* | 5/2003 | Luo | G06F 1/32 713/320 |
| 2003/0135595 | A1* | 7/2003 | Segelstein | H04L 29/12009 709/223 |
| 2004/0252694 | A1* | 12/2004 | Adhikari | H04L 41/12 370/395.2 |
| 2010/0005179 | A1* | 1/2010 | Dickson | H04L 63/30 709/228 |
| 2010/0202320 | A1* | 8/2010 | Bennett | H04W 84/18 370/254 |
| 2012/0147127 | A1* | 6/2012 | Satterlee | H04N 7/152 348/14.08 |
| 2014/0086561 | A1* | 3/2014 | Kim | H04N 5/76 386/279 |
| 2015/0033297 | A1 | 1/2015 | Sanso et al. | |
| 2015/0124809 | A1 | 5/2015 | Edsall et al. | |
| 2015/0188731 | A1* | 7/2015 | Daly | H04L 12/5689 709/224 |
| 2015/0365238 | A1* | 12/2015 | Hui | H04L 9/3247 713/178 |
| 2016/0102878 | A1* | 4/2016 | Smith | H04L 67/141 700/276 |

* cited by examiner

DYNAMIC ATTRIBUTE BASED APPLICATION POLICY

RELATED APPLICATIONS

This application claims priority to U.S. Provisional Application No. 62/167,717, entitled "DYNAMIC ATTRIBUTE BASED APPLICATION POLICY," filed May 28, 2015, which is incorporated herein by reference in its entirety.

TECHNICAL FIELD

The present technology relates in general to the field of computer networks, and more specifically to dynamically assigning an end point to an end point group.

BACKGROUND

Modern computing networks operate with an increasing number of computing nodes to support a wide variety of applications and services. As each endpoint is added to a network, an administrator must configure the endpoint with the appropriate settings. For example, an administrator can assign the end point to a desired end point group which can define policies for the end points in the end point group, such as specifying a security group for each end point. This can be an arduous and time consuming task. As a result, an administrator may spend a high amount of time performing this task and, as with any task performed by a human user, there is a potential for error.

BRIEF DESCRIPTION OF THE DRAWINGS

In order to describe the manner in which the above-recited and other advantages and features of the disclosure can be obtained, a more particular description of the principles briefly described above will be rendered by reference to specific examples thereof which are illustrated in the appended drawings. Understanding that these drawings depict only examples of the disclosure and are not therefore to be considered to be limiting of its scope, the principles herein are described and explained with additional specificity and detail through the use of the accompanying drawings in which.

DESCRIPTION OF EXAMPLE EMBODIMENTS

Figure 1:
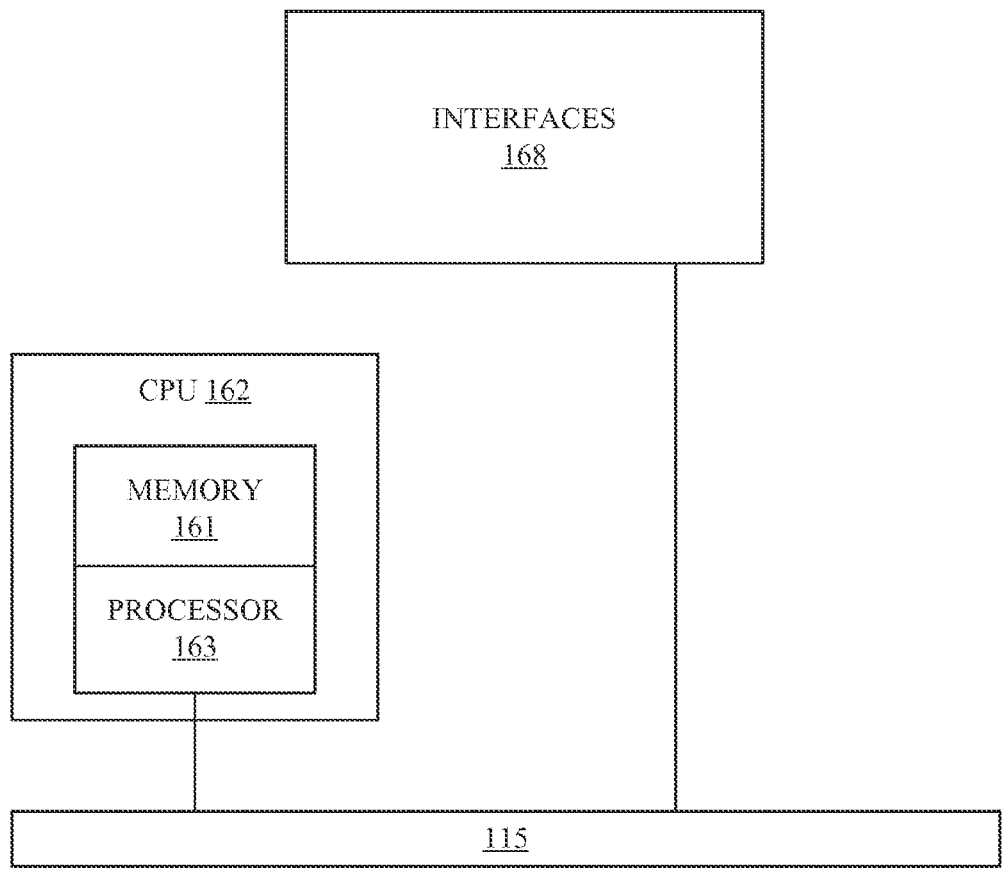
FIG. 1 illustrates an example network device according to some aspects of the subject technology.

The detailed description set forth below is intended as a description of various configurations of the subject technology and is not intended to represent the only configurations in which the subject technology can be practiced. The appended drawings are incorporated herein and constitute a part of the detailed description. The detailed description includes specific details for the purpose of providing a more thorough understanding of the subject technology. However, it will be clear and apparent that the subject technology is not limited to the specific details set forth herein and may be practiced without these details. In some instances, structures and components are shown in block diagram form in order to avoid obscuring the concepts of the subject technology.

Overview:

Disclosed are systems, methods, and computer-readable storage media for dynamically assigning an end point to an end point group. A policy controller can assign and end point to a default end point group when the end point is initially added to a network. For example, the default end point group can include a baseline port/security group which is considered an untrusted group. The policy controller can then dynamically assign the end point to an end point group based on a set of group selection rules and attribute data collected from the end point.

The group selection rules can identify an end point group based on attribute data gathered from the end point after the end point has been added to the network. These attributes can include end point attributes, geographical attributes, connectivity attributes, temporal attributes, environmental attributes, and user-defined or third-party defined attributes. End point attributes are attributes such as operating system, vendor information, software versions, and security posture. Geographical attributes may include physical location of the network connection, datacenter, city, state, or country. Connectivity attributes may include the type of physical interface, bandwidth of the link, physical server in the case of virtual end points, and security assessment of the connectivity. Temporal attributes can include the time of day, date, etc., such as during work hours, during a quiet period from an SEC perspective, etc. Environmental attributes include temperature of the devices, cooling capacity, power availability, etc. Third-party attributes may include security software assessments, feedback from network services such as load balancers, etc.

As a specific example, the policy controller can assign an end point to an end point group based on the media access control (MAC) address of the end point. The policy controller can assign the end point to a default end point group when the end point is initially added to the network. After the end point is added to the network, the policy controller can determine the MAC address of the end point and use the MAC address to assign the end point to an end point group. As another example, the policy controller can assign an end point to an end point group based on the amount of network traffic or guest operation system associated with the end point.

DETAILED DESCRIPTION

A computer network can be a geographically distributed collection of nodes interconnected by communication links and segments for transporting data. A node in a computer network can be computing device such as a switch (e.g., router) or an end point (e.g., a host device, personal computer, workstation, virtual machine, etc.). A computer network can be used to transport data between end points, such as personal computers, workstations, virtual machines, etc. Many types of networks are available, with the types ranging from local area networks (LANs) and wide area networks (WANs) to overlay and software-defined networks, such as virtual extensible local area networks (VXLANs).

LANs typically connect nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), or synchronous digital hierarchy (SDH) links. LANs and WANs can include layer 2 (L2) and/or layer 3 (L3) networks and devices.

The Internet is an example of a WAN that connects disparate networks throughout the world, providing global communication between nodes on various networks. The nodes typically communicate over the network by exchanging discrete frames or packets of data according to predefined protocols, such as the Transmission Control Protocol/Internet Protocol (TCP/IP). In this context, a protocol can refer to a set of rules defining how the nodes interact with each other for transferring data. Computer networks may be further interconnected by an intermediate network node, such as a router, to extend the effective "size" of each network.

Overlay networks generally allow virtual networks to be created and layered over a physical network infrastructure. Overlay network protocols, such as Virtual Extensible LAN (VXLAN), Network Virtualization using Generic Routing Encapsulation (NVGRE), Network Virtualization Overlays (NVO3), and Stateless Transport Tunneling (STT), provide a traffic encapsulation scheme which allows network traffic to be carried across L2 and L3 networks over a logical tunnel. Such logical tunnels can be originated and terminated through virtual tunnel end points (VTEPs).

Moreover, overlay networks can include virtual segments, such as VXLAN segments in a VXLAN overlay network, which can include virtual L2 and/or L3 overlay networks over which virtual machines (VMs) communicate. The virtual segments can be identified through a virtual network identifier (VNI), such as a VXLAN network identifier, which can specifically identify an associated virtual segment or domain.

Network virtualization allows hardware and software resources to be combined in a virtual network. For example, network virtualization can allow multiple numbers of VMs to be attached to the physical network via respective virtual LANs (VLANs). The VMs can be grouped according to their respective VLAN, and can communicate with other VMs as well as other devices on the internal or external network.

Network segments, such as physical or virtual segments; networks; devices; ports; physical or logical links; and/or traffic in general can be grouped into a bridge or flood domain. A bridge domain or flood domain can represent a broadcast domain, such as an L2 broadcast domain. A bridge domain or flood domain can include a single subnet, but can also include multiple subnets. Moreover, a bridge domain can be associated with a bridge domain interface on a network device, such as a switch. A bridge domain interface can be a logical interface which supports traffic between an L2 bridged network and an L3 routed network. In addition, a bridge domain interface can support internet protocol (IP) termination, VPN termination, address resolution handling, MAC addressing, etc. Both bridge domains and bridge domain interfaces can be identified by a same index or identifier.

Furthermore, endpoint groups (EPGs) can be used in a network for mapping applications to the network. In particular, EPGs can use a grouping of application endpoints in a network to apply connectivity and policy to the group of applications. EPGs can act as a container for buckets or collections of applications, or application components, and tiers for implementing forwarding and policy logic. EPGs also allow separation of network policy, security, and forwarding from addressing by instead using logical application boundaries.

Cloud computing can also be provided in one or more networks to provide computing services using shared resources. Cloud computing can generally include Internet-based computing in which computing resources are dynamically provisioned and allocated to client or user computers or other devices on-demand, from a collection of resources available via the network (e.g., "the cloud"). Cloud computing resources, for example, can include any type of resource, such as computing, storage, and network devices, virtual machines (VMs), etc. For instance, resources may include service devices (firewalls, deep packet inspectors, traffic monitors, load balancers, etc.), compute/processing devices (servers, CPU's, memory, brute force processing capability), storage devices (e.g., network attached storages, storage area network devices), etc. In addition, such resources may be used to support virtual networks, virtual machines (VM), databases, applications (Apps), etc.

Cloud computing resources may include a "private cloud," a "public cloud," and/or a "hybrid cloud." A "hybrid cloud" can be a cloud infrastructure composed of two or more clouds that inter-operate or federate through technology. In essence, a hybrid cloud is an interaction between private and public clouds where a private cloud joins a public cloud and utilizes public cloud resources in a secure and scalable manner. Cloud computing resources can also be provisioned via virtual networks in an overlay network, such as a VXLAN.

The disclosed technology addresses the need in the art for dynamically assigning an end point to an end point group. A policy controller can assign an end point to a default end point group when the end point is initially added to the network. The policy controller can then dynamically assign the end point to an end point group based on a set of group selection rules and attribute data collected from the end point. An introductory description of exemplary systems and networks, as illustrated in FIGS. 1 through 4, is disclosed herein. A detailed description of the policy controller, and example variations, will then follow. These variations shall be described as the various embodiments are set forth. The disclosure now turns to FIG. 1.

FIG. 1 illustrates an exemplary network device 110 suitable for implementing the present technology. Network device 110 includes a master central processing unit (CPU) 162, interfaces 168, and a bus 115 (e.g., a PCI bus). When acting under the control of appropriate software or firmware, the CPU 162 is responsible for executing packet management, error detection, and/or routing functions, such policy enforcement, for example. The CPU 162 preferably accomplishes all these functions under the control of software including an operating system and any appropriate applications software. CPU 162 may include one or more processors 163 such as a processor from the Motorola family of microprocessors or the MIPS family of microprocessors. In an alternative embodiment, processor 163 is specially designed hardware for controlling the operations of router 110. In a specific embodiment, a memory 161 (such as non-volatile RAM and/or ROM) also forms part of CPU 162. However, there are many different ways in which memory could be coupled to the system.

The interfaces 168 are typically provided as interface cards (sometimes referred to as "line cards"). Generally, they control the sending and receiving of data packets over the network and sometimes support other peripherals used with the network device 110. Among the interfaces that may be provided are Ethernet interfaces, frame relay interfaces, cable interfaces, DSL interfaces, token ring interfaces, and the like. In addition, various very high-speed interfaces may be provided such as fast token ring interfaces, wireless interfaces, Ethernet interfaces, Gigabit Ethernet interfaces, ATM interfaces, HSSI interfaces, POS interfaces, FDDI interfaces and the like. Generally, these interfaces may include ports appropriate for communication with the appropriate media. In some cases, they may also include an independent processor and, in some instances, volatile RAM. The independent processors may control such communications intensive tasks as packet switching, media control, and management. By providing separate processors for the communications intensive tasks, these interfaces allow the master microprocessor 162 to efficiently perform routing computations, network diagnostics, security functions, etc.

Although the system shown in FIG. 1 is one specific network device of the present technology, it is by no means the only network device architecture on which the present technology can be implemented. For example, an architecture having a single processor that handles communications as well as routing computations, etc. is often used. Further, other types of interfaces and media could also be used with the router.

Regardless of the network device's configuration, it may employ one or more memories or memory modules (including memory 161) configured to store program instructions for the general-purpose network operations and mechanisms for roaming, route optimization and routing functions described herein. The program instructions may control the operation of an operating system and/or one or more applications, for example. The memory or memories may also be configured to store tables such as mobility binding, registration, and association tables, etc.

Figure 2A:
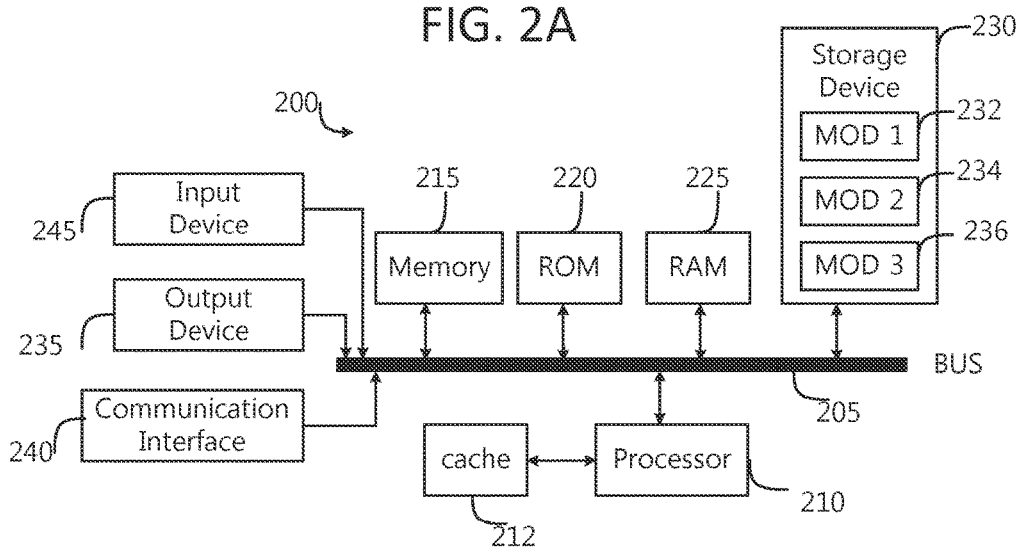
FIGS. 2A and 2B illustrate an example system embodiments according to some aspects of the subject technology.
Figure 2B:
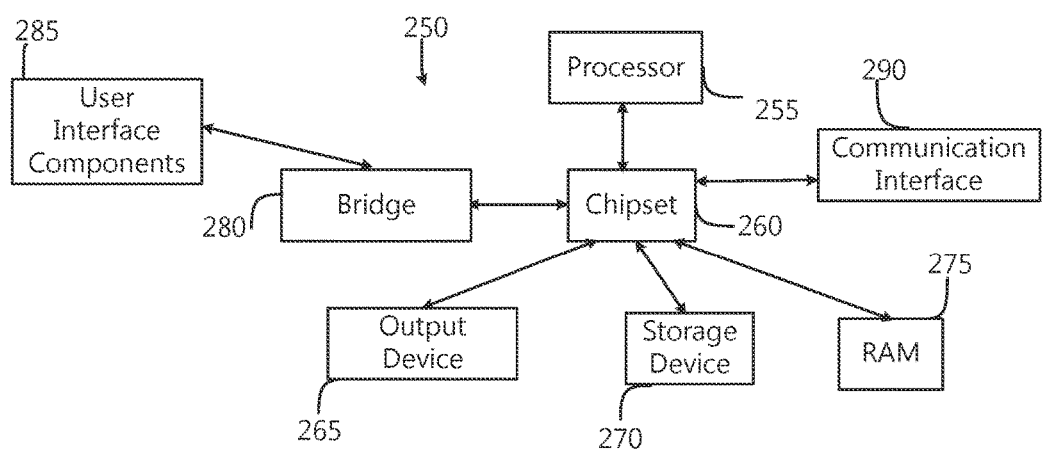

FIG. 2A, and FIG. 2B illustrate exemplary possible system embodiments. The more appropriate embodiment will be apparent to those of ordinary skill in the art when practicing the present technology. Persons of ordinary skill in the art will also readily appreciate that other system embodiments are possible.

FIG. 2A illustrates a conventional system bus computing system architecture 200 wherein the components of the system are in electrical communication with each other using a bus 205. Exemplary system 200 includes a processing unit (CPU or processor) 210 and a system bus 205 that couples various system components including the system memory 215, such as read only memory (ROM) 220 and random access memory (RAM) 225, to the processor 210. The system 200 can include a cache of high-speed memory connected directly with, in close proximity to, or integrated as part of the processor 210. The system 200 can copy data from the memory 215 and/or the storage device 230 to the cache 212 for quick access by the processor 210. In this way, the cache can provide a performance boost that avoids processor 210 delays while waiting for data. These and other modules can control or be configured to control the processor 210 to perform various actions. Other system memory 215 may be available for use as well. The memory 215 can include multiple different types of memory with different performance characteristics. The processor 210 can include any general purpose processor and a hardware module or software module, such as module 1 232, module 2 234, and module 3 236 stored in storage device 230, configured to control the processor 210 as well as a special-purpose processor where software instructions are incorporated into the actual processor design. The processor 210 may essentially be a completely self-contained computing system, containing multiple cores or processors, a bus, memory controller, cache, etc. A multi-core processor may be symmetric or asymmetric.

To enable user interaction with the computing device 200, an input device 245 can represent any number of input mechanisms, such as a microphone for speech, a touch-sensitive screen for gesture or graphical input, keyboard, mouse, motion input, speech and so forth. An output device 235 can also be one or more of a number of output mechanisms known to those of skill in the art. In some instances, multimodal systems can enable a user to provide multiple types of input to communicate with the computing device 200. The communications interface 240 can generally govern and manage the user input and system output. There is no restriction on operating on any particular hardware arrangement and therefore the basic features here may easily be substituted for improved hardware or firmware arrangements as they are developed.

Storage device 230 is a non-volatile memory and can be a hard disk or other types of computer readable media which can store data that are accessible by a computer, such as magnetic cassettes, flash memory cards, solid state memory devices, digital versatile disks, cartridges, random access memories (RAMs) 225, read only memory (ROM) 220, and hybrids thereof.

The storage device 230 can include software modules 232, 234, 236 for controlling the processor 210. Other hardware or software modules are contemplated. The storage device 230 can be connected to the system bus 205. In one aspect, a hardware module that performs a particular function can include the software component stored in a computer-readable medium in connection with the necessary hardware components, such as the processor 210, bus 205, display 235, and so forth, to carry out the function.

FIG. 2B illustrates a computer system 250 having a chipset architecture that can be used in executing the described method and generating and displaying a graphical user interface (GUI). Computer system 250 is an example of computer hardware, software, and firmware that can be used to implement the disclosed technology. System 250 can include a processor 255, representative of any number of physically and/or logically distinct resources capable of executing software, firmware, and hardware configured to perform identified computations. Processor 255 can communicate with a chipset 260 that can control input to and output from processor 255. In this example, chipset 260 outputs information to output 265, such as a display, and can read and write information to storage device 270, which can include magnetic media, and solid state media, for example. Chipset 260 can also read data from and write data to RAM 275. A bridge 280 for interfacing with a variety of user interface components 285 can be provided for interfacing with chipset 260. Such user interface components 285 can include a keyboard, a microphone, touch detection and processing circuitry, a pointing device, such as a mouse, and so on. In general, inputs to system 250 can come from any of a variety of sources, machine generated and/or human generated.

Chipset 260 can also interface with one or more communication interfaces 290 that can have different physical interfaces. Such communication interfaces can include interfaces for wired and wireless local area networks, for broadband wireless networks, as well as personal area networks. Some applications of the methods for generating, displaying, and using the GUI disclosed herein can include receiving ordered datasets over the physical interface or be generated by the machine itself by processor 255 analyzing data stored in storage 270 or 275. Further, the machine can receive inputs from a user via user interface components 285 and execute appropriate functions, such as browsing functions by interpreting these inputs using processor 255.

It can be appreciated that exemplary systems 200 and 250 can have more than one processor 210 or be part of a group or cluster of computing devices networked together to provide greater processing capability.

Figure 3:
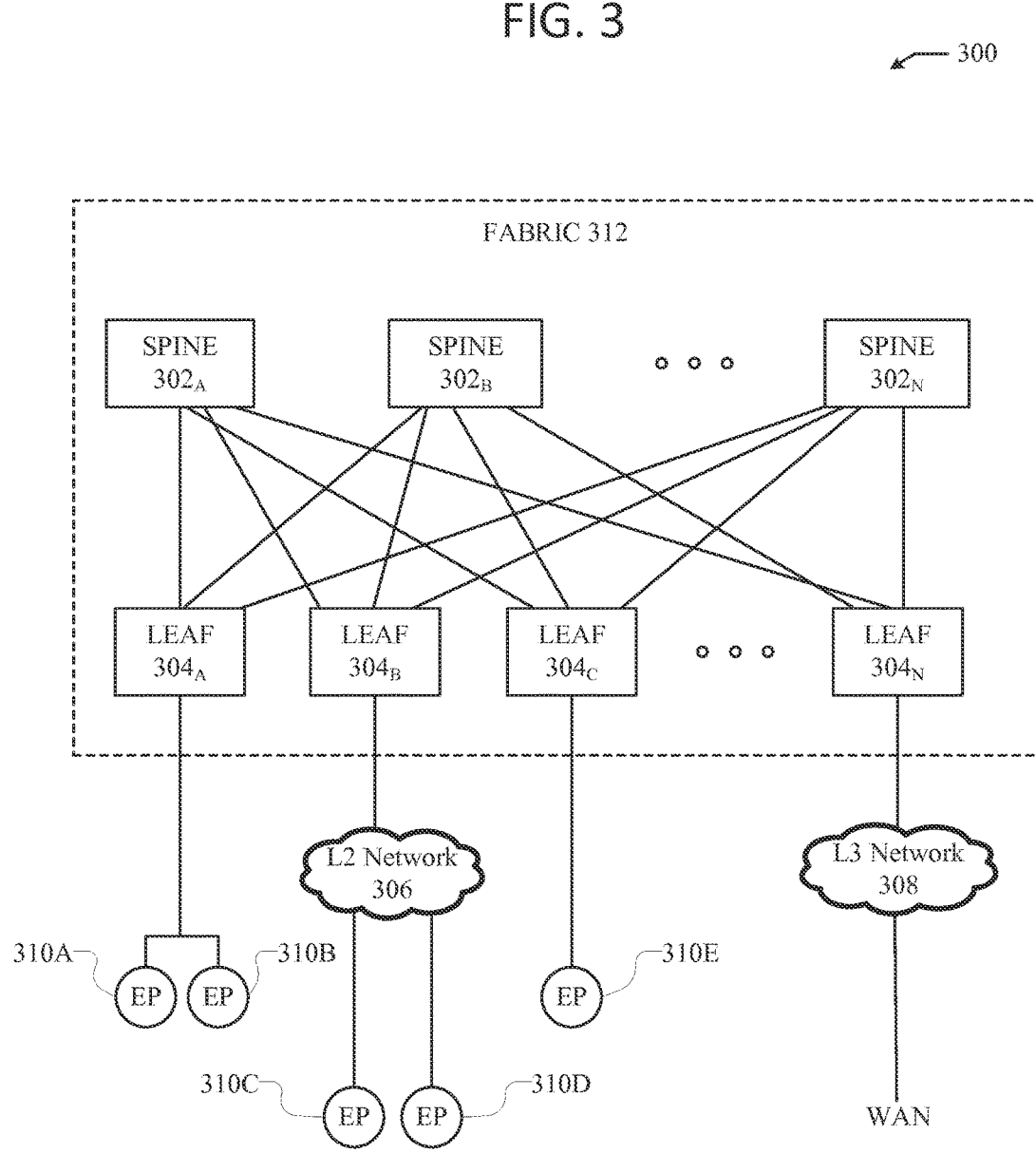
FIG. 3 illustrates a schematic block diagram of an example architecture for a network fabric.

FIG. 3 illustrates a schematic block diagram of an example architecture 300 for a network fabric 312. The network fabric 312 can include spine switches $302_A$, $302_B$, ..., $302_N$ (collectively "302") connected to leaf switches $304_A$, $304_B$, $304_C$ ... $304_N$ (collectively "304") in the network fabric 312.

Spine switches 302 can be L3 switches in the fabric 312. However, in some cases, the spine switches 302 can also, or otherwise, perform L2 functionalities. Further, the spine switches 302 can support various capabilities, such as 40 or 10 Gbps Ethernet speeds. To this end, the spine switches 302 can include one or more 40 Gigabit Ethernet ports. Each port can also be split to support other speeds. For example, a 40 Gigabit Ethernet port can be split into four 10 Gigabit Ethernet ports.

In some embodiments, one or more of the spine switches 302 can be configured to host a proxy function that performs a lookup of the endpoint address identifier to locator mapping in a mapping database on behalf of leaf switches 304 that do not have such mapping. The proxy function can do this by parsing through the packet to the encapsulated, tenant packet to get to the destination locator address of the tenant. The spine switches 302 can then perform a lookup of their local mapping database to determine the correct locator address of the packet and forward the packet to the locator address without changing certain fields in the header of the packet.

When a packet is received at a spine switch $302_i$, the spine switch $302_i$ can first check if the destination locator address is a proxy address. If so, the spine switch $302_i$ can perform the proxy function as previously mentioned. If not, the spine switch $302_i$ can look up the locator in its forwarding table and forward the packet accordingly.

Spine switches 302 connect to leaf switches 304 in the fabric 312. Leaf switches 304 can include access ports (or non-fabric ports) and fabric ports. Fabric ports can provide uplinks to the spine switches 302, while access ports can provide connectivity for devices, hosts, endpoints, VMs, or external networks to the fabric 312.

Leaf switches 304 can reside at the edge of the fabric 312, and can thus represent the physical network edge. In some cases, the leaf switches 304 can be top-of-rack ("ToR") switches configured according to a ToR architecture. In other cases, the leaf switches 304 can be aggregation switches in any particular topology, such as end-of-row (EoR) or middle-of-row (MoR) topologies. The leaf switches 304 can also represent aggregation switches, for example.

The leaf switches 304 can be responsible for routing and/or bridging the tenant packets and applying network policies. In some cases, a leaf switch can perform one or more additional functions, such as implementing a mapping cache, sending packets to the proxy function when there is a miss in the cache, encapsulate packets, enforce ingress or egress policies, etc.

Moreover, the leaf switches 304 can contain virtual switching functionalities, such as a virtual tunnel endpoint (VTEP) function as explained below in the discussion of VTEP 408 in FIG. 4. To this end, leaf switches 304 can connect the fabric 312 to an overlay network, such as overlay network 400 illustrated in FIG. 4.

Network connectivity in the fabric 312 can flow through the leaf switches 304. Here, the leaf switches 304 can provide servers, resources, endpoints, external networks, or VMs access to the fabric 312, and can connect the leaf switches 304 to each other. In some cases, the leaf switches 304 can connect EPGs to the fabric 312 and/or any external networks. Each EPG can connect to the fabric 312 via one of the leaf switches 304, for example.

Endpoints 310A-E (collectively "310") can connect to the fabric 312 via leaf switches 304. For example, endpoints 310A and 310B can connect directly to leaf switch 304A, which can connect endpoints 310A and 310B to the fabric 312 and/or any other one of the leaf switches 304. Similarly, endpoint 310E can connect directly to leaf switch 304C, which can connect endpoint 310E to the fabric 312 and/or any other of the leaf switches 304. On the other hand, endpoints 310C and 310D can connect to leaf switch 304B via L2 network 306. Similarly, the wide area network (WAN) can connect to the leaf switches 304C or 304D via L3 network 308.

Endpoints 310 can include any communication device, such as a computer, a server, a switch, a router, etc. In some cases, the endpoints 310 can include a server, hypervisor, or switch configured with a VTEP functionality which connects an overlay network, such as overlay network 400 below, with the fabric 312. For example, in some cases, the endpoints 310 can represent one or more of the VTEPs 408A-D illustrated in FIG. 4. Here, the VTEPs 408A-D can connect to the fabric 312 via the leaf switches 304. The overlay network can host physical devices, such as servers, applications, EPGs, virtual segments, virtual workloads, etc. In addition, the endpoints 310 can host virtual workload(s), clusters, and applications or services, which can connect with the fabric 312 or any other device or network, including an external network. For example, one or more endpoints 310 can host, or connect to, a cluster of load balancers or an EPG of various applications.

Although the fabric 312 is illustrated and described herein as an example leaf-spine architecture, one of ordinary skill in the art will readily recognize that the subject technology can be implemented based on any network fabric, including any data center or cloud network fabric. Indeed, other architectures, designs, infrastructures, and variations are contemplated herein.

Figure 4:
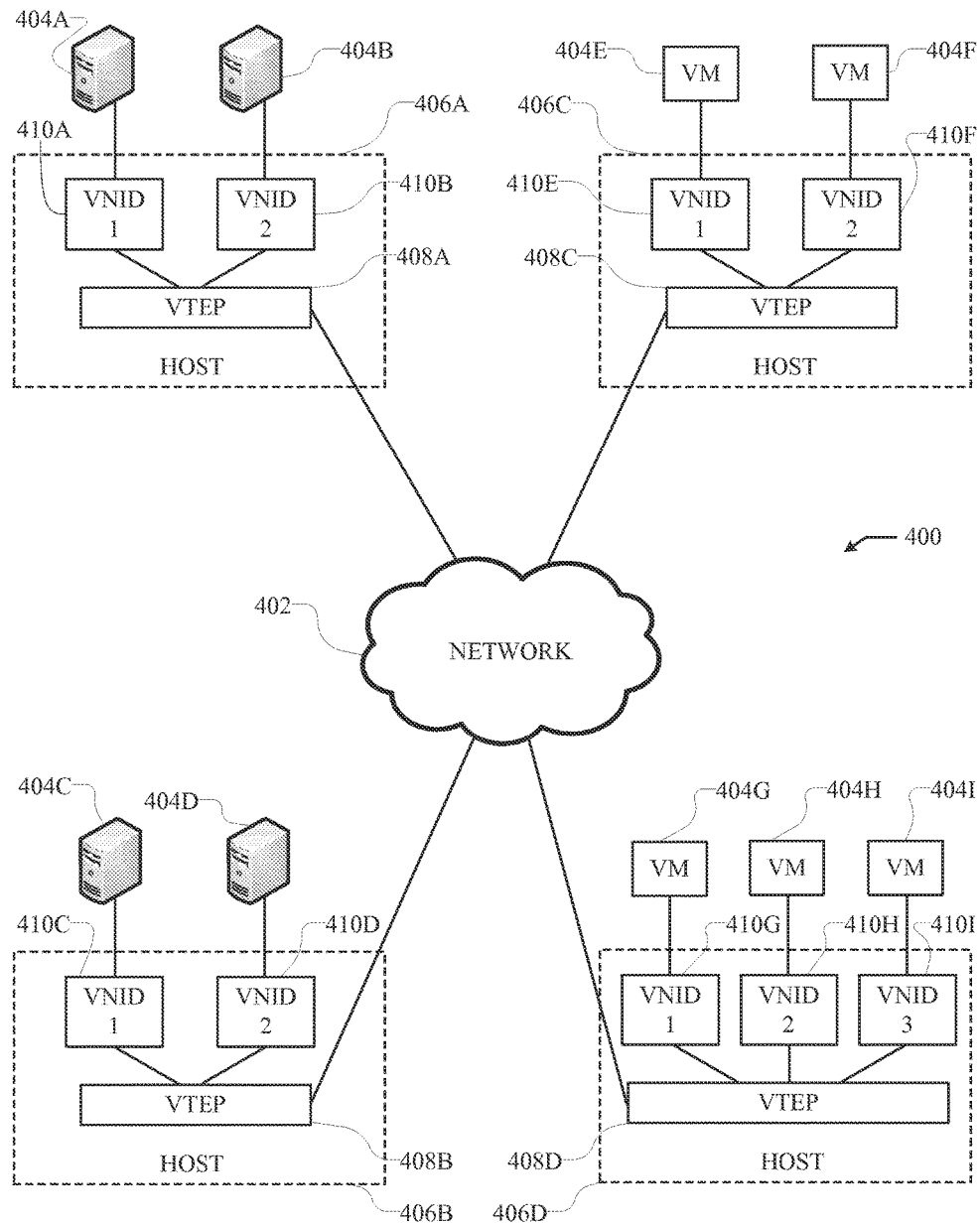
FIG. 4 illustrates an example overlay network.

FIG. 4 illustrates an exemplary overlay network 400. Overlay network 400 uses an overlay protocol, such as VXLAN, VGRE, VO3, or STT, to encapsulate traffic in L2 and/or L3 packets which can cross overlay L3 boundaries in the network. As illustrated in FIG. 4, overlay network 400 can include hosts 406A-D interconnected via network 402.

Network 402 can include a packet network, such as an IP network, for example. Moreover, network 402 can connect the overlay network 400 with the fabric 312 in FIG. 3. For example, VTEPs 408A-D can connect with the leaf switches 304 in the fabric 312 via network 402.

Hosts 406A-D include virtual tunnel end points (VTEP) 408A-D, which can be virtual nodes or switches configured to encapsulate and de-encapsulate data traffic according to a specific overlay protocol of the network 400, for the various virtual network identifiers (VNIDs) 410A-I. Moreover, hosts 406A-D can include servers containing a VTEP functionality, hypervisors, and physical switches, such as L3 switches, configured with a VTEP functionality. For example, hosts 406A and 406B can be physical switches configured to run VTEPs 408A-B. Here, hosts 406A and 406B can be connected to servers 404A-D, which, in some cases, can include virtual workloads through VMs loaded on the servers, for example.

In some embodiments, network 400 can be a VXLAN network, and VTEPs 408A-D can be VXLAN tunnel end points (VTEP). However, as one of ordinary skill in the art will readily recognize, network 400 can represent any type of overlay or software-defined network, such as NVGRE, STT, or even overlay technologies yet to be invented.

The VNIDs can represent the segregated virtual networks in overlay network 400. Each of the overlay tunnels (VTEPs 408A-D) can include one or more VNIDs. For example, VTEP 408A can include VNIDs 1 and 2, VTEP 408B can include VNIDs 1 and 2, VTEP 408C can include VNIDs 1 and 2, and VTEP 408D can include VNIDs 1-3. As one of ordinary skill in the art will readily recognize, any particular VTEP can, in other embodiments, have numerous VNIDs, including more than the 3 VNIDs illustrated in FIG. 4.

The traffic in overlay network 400 can be segregated logically according to specific VNIDs. This way, traffic intended for VNID 1 can be accessed by devices residing in VNID 1, while other devices residing in other VNIDs (e.g., VNIDs 2 and 3) can be prevented from accessing such traffic. In other words, devices or endpoints connected to specific VNIDs can communicate with other devices or endpoints connected to the same specific VNIDs, while traffic from separate VNIDs can be isolated to prevent devices or endpoints in other specific VNIDs from accessing traffic in different VNIDs.

Servers 404A-D and VMs 404E-I can connect to their respective VNID or virtual segment, and communicate with other servers or VMs residing in the same VNID or virtual segment. For example, server 404A can communicate with server 404C and VMs 404E and 404G because they all reside in the same VNID, viz., VNID 1. Similarly, server 404B can communicate with VMs 404F and 404H because they all reside in VNID 2. VMs 404E-I can host virtual workloads, which can include application workloads, resources, and services, for example. However, in some cases, servers 404A-D can similarly host virtual workloads through VMs hosted on the servers 404A-D. Moreover, each of the servers 404A-D and VMs 404E-I can represent a single server or VM, but can also represent multiple servers or VMs, such as a cluster of servers or VMs.

VTEPs 408A-D can encapsulate packets directed at the various VNIDs 1-3 in the overlay network 400 according to the specific overlay protocol implemented, such as VXLAN, so traffic can be properly transmitted to the correct VNID and recipient(s). Moreover, when a switch, router, or other network device receives a packet to be transmitted to a recipient in the overlay network 400, it can analyze a routing table, such as a lookup table, to determine where such packet needs to be transmitted so the traffic reaches the appropriate recipient. For example, if VTEP 408A receives a packet from endpoint 404B that is intended for endpoint 404H, VTEP 408A can analyze a routing table that maps the intended endpoint, endpoint 404H, to a specific switch that is configured to handle communications intended for endpoint 404H. VTEP 408A might not initially know, when it receives the packet from endpoint 404B, that such packet should be transmitted to VTEP 408D in order to reach endpoint 404H. Accordingly, by analyzing the routing table, VTEP 408A can lookup endpoint 404H, which is the intended recipient, and determine that the packet should be transmitted to VTEP 408D, as specified in the routing table based on endpoint-to-switch mappings or bindings, so the packet can be transmitted to, and received by, endpoint 404H as expected.

However, continuing with the previous example, in many instances, VTEP 408A may analyze the routing table and fail to find any bindings or mappings associated with the intended recipient, e.g., endpoint 404H. Here, the routing table may not yet have learned routing information regarding endpoint 404H. In this scenario, the VTEP 408A may likely broadcast or multicast the packet to ensure the proper switch associated with endpoint 404H can receive the packet and further route it to endpoint 404H.

In some cases, the routing table can be dynamically and continuously modified by removing unnecessary or stale entries and adding new or necessary entries, in order to maintain the routing table up-to-date, accurate, and efficient, while reducing or limiting the size of the table.

Figure 5:
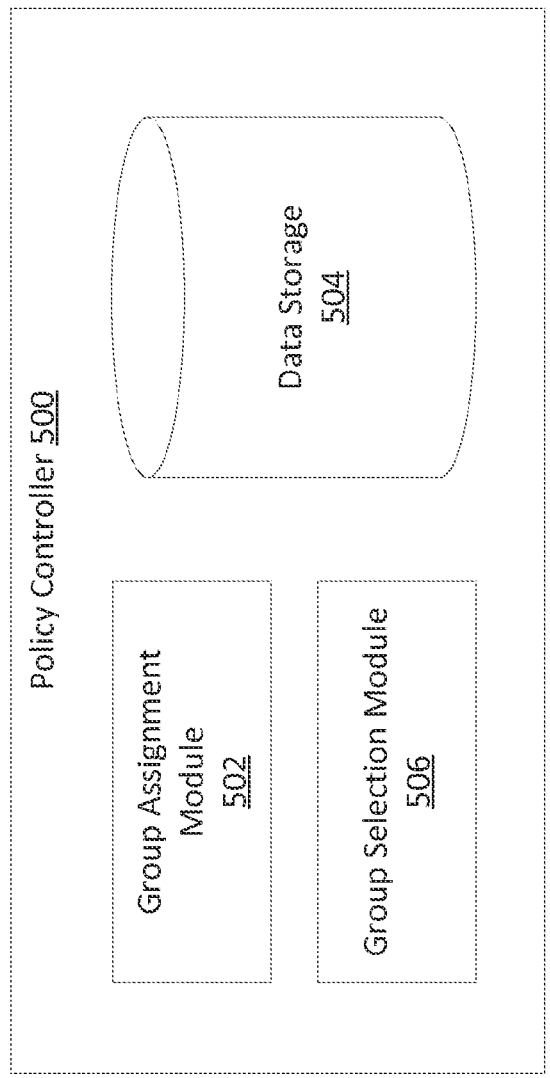
FIG. 5 illustrates an example system embodiment of a policy controller 500 configured to dynamically assign end points to end point groups.

FIG. 5 illustrates an example system embodiment of a policy controller 500 configured to dynamically assign end points to end point groups. An end point group can be assigned or associated with a set of attributes and/or policies, which can then be implemented to the end points added to the end point groups. For example, the attributes and policies can dictate rules, conditions, and/or use of the end points, such as define security levels, resource usage, etc., for the end points.

The policy controller 500 can be made up of one or more computing nodes in a computing network. For example, the controller 500 can be made up of one or more switches, routers, end points, computing devices, etc., or combination thereof in the computing network. The policy controller 500 can be configured to communicate with end points in the network and assign the end points to an end point group.

In some embodiments, the policy controller 500 can assign an end point to a default end point group when the end point is initially added to the network. A default end point group can be a placeholder end point group for initially bootstrapping the end point into a correct end point group. For example, the default end point group can be represented as a single port group within the network that allows the end point to be placed into the network until the end point can be assigned to an appropriate end point group. In some embodiments, the default end point group can be considered an untrusted end point group.

In some embodiments, an administrator can assign an end point to the default end point group when the end point is added to the network. Alternatively, in some embodiments, the policy controller 500 can assign the end point to the default end point group. As shown, the policy controller 500 can include group assignment module 502 that is configured to assign an end point to an end point group. For example, the group assignment module 502 can be configure to communicate with an end point and configure the end point by, for example, adjusting settings, changing the port group, etc.

Further, the group assignment module 502 can access and modify an end point group index to indicate that an end point is assigned to a specified end point group. An end point group index can be a file, index, etc., that lists the various end points groups and the end points assigned to each end point group. In some embodiments, the policy controller 500 can include a data storage 504 that maintains the end point group index and the group assignment module 502 can be configured to communicate with the data storage 504 to access and modify the end point group index.

Once added to the default end point group, the policy controller 500 can begin gathering attribute data from an end point and then assign the end point to an end point group based on the attribute data. For example, the policy controller 500 can include an group selection module 506 configured to gather attribute data and select an end point group for an end point based on the attribute data.

Attribute data can be any type of data describing the end point and the end point's interaction with the network and/or other nodes in the network. For example, attribute data can include end point attributes, geographical attributes, connectivity attributes, temporal attributes, environmental attributes, and user-defined or third-party defined attributes.

End point attributes can be attributes describing the end point. For example, end point attribute can include data such as the operating system utilized by the end point, vendor information associated with the end point, software utilized by the end point, versions of the software, security posture, etc. Further, end point attributes can describe performance and/or utilization of the end point, such as network traffic, applications, etc.

Geographical attributes can be attributes describing the location of the end point. For example, geographical attributes can include data such as the physical location of the network connection utilized by the end point, the physical location of the datacenter, city, state, or country.

Connectivity attributes can describe a network connection utilized by the end point. For example, connectivity attributes can include data such as the type of physical interface utilized by the end point, MAC address, bandwidth of the link, physical server in the case of virtual end points, and security assessment of the connectivity.

Temporal attributes can describe time. For example, temporal attributes can include the time of day, date, etc. Further, temporal attributes can describe context for a time such as during work hours, during a quiet period from an SEC perspective, etc. As another example, temporal attributes can describe performance of the end point based on time, such as times when the end point is used the most or network traffic is at its highest.

Environmental attributes can describe the environment of the end point. For example, environmental attributes can include the temperature of the end point or datacenter, cooling capacity, power availability, etc.

Third-party attributes can describe feedback from other software or devices. For example, third-party attributes can include security software assessments, feedback from network services such as load balancers, etc.

The group selection module 506 can select an end point group for an end point based on the gathered attribute data and a set of group selection rules. The group selection rules can be a set of rules that dictate selection of an end point group based on attribute data.

In some embodiments, the group selections rules can provide a mapping of one or more attributes to an end point group. The mapping can include a direct mapping between a specific attribute value and an end point group or, alternatively, a range of values mapped to an end point group.

As an example, the group selection rules can provide a mapping to an end point group based on the MAC address utilized by an end point. The group selection module 506 can gather the MAC address utilized by the end point and use the group selection rules to determine the corresponding end point group mapped to the MAC address.

As another example, the group selection rules can provide a mapping to an end point group based on network traffic. For example, the group selection rules can provide a mapping between value ranges for network traffic and end point groups. The group selection module 506 can determine which value range the network traffic associated with an end point falls within and then identify the corresponding end point group.

As another example, the group selection rules can provide a mapping based on multiple attributes, such as MAC address and network traffic. The end point selection module can gather both the MAC address and network traffic for an end point and use the group selection rules to determine the corresponding end point group.

In some embodiments, the group selection rules can include dictate selection of an end point group based on a group selection score calculated for the end point. For example, the group selection rules ca dictate a direct mapping of a group selection scores to a corresponding end point group or, alternatively, a mapping between group selection score ranges and end an end point groups.

A group selection score can be a score calculated for an end point group based on one or more attributes. For example, the group selection rules can dictate how the group selection rules are to be calculated. This can include identifying the attributes to be used as input to calculate the group selection score, assigning scores to specified attribute values, defining weighs for the attributes, etc. The group selection module 506 can use gathered attribute data and the group selection rules to calculate a group selection score for an end point and then identify the corresponding end point group.

Once the group selection module 506 has selected an end point group for an end point, the group assignment module 505 can assign the end point to the selected group.

Figure 6:
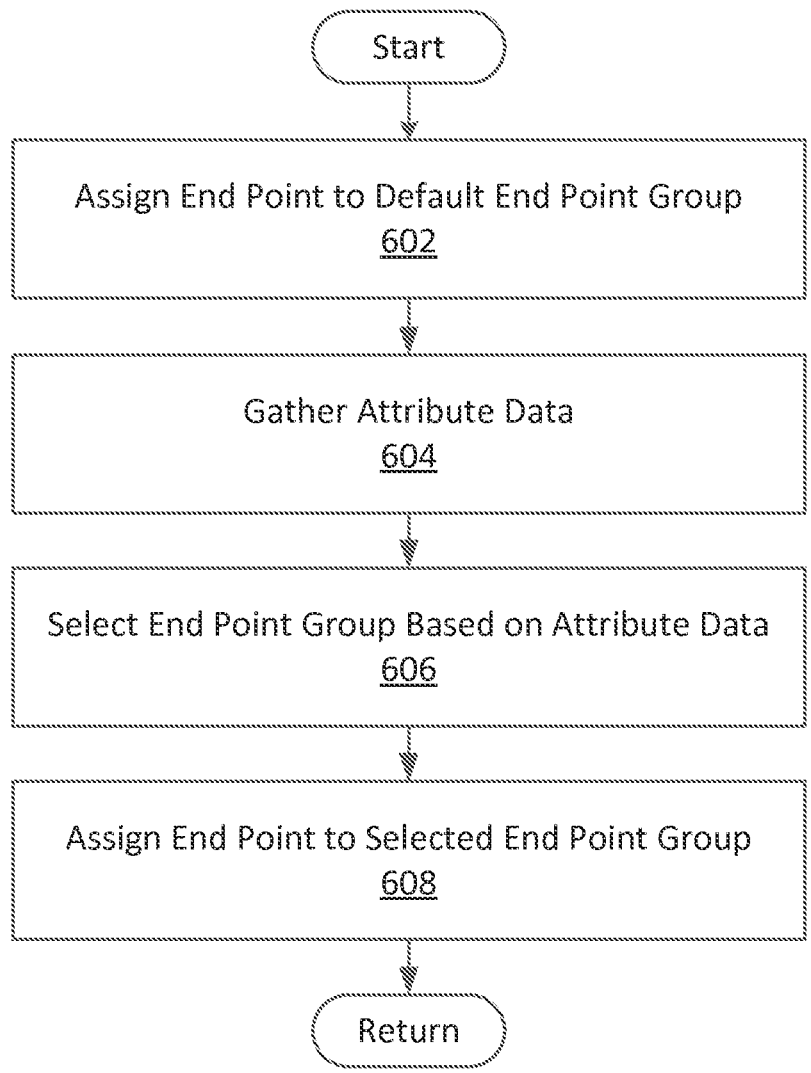
FIG. 6 illustrates an example embodiment of assigning an end point to an end point group.

Having disclosed some basic system components and concepts, the disclosure now turns to an example method shown in FIG. 6. For the sake of clarity, the method is described in terms of systems shown in FIGS. 1-5. The steps outlined herein are example and can be implemented in any combination thereof, including combinations that exclude, add, or modify certain steps.

FIG. 6 illustrates an example embodiment of assigning an end point to an end point group. As shown, the method begins at step 602 where a policy controller assigns an end point to a default end point group when the end point is added to a computer network. The default end point group can be a placeholder end point group for initially bootstrapping the end point into a correct end point group.

At step 604, the policy controller can gather attribute data associated with the end point that describes the end point and end point's interaction with the network. For example, the attribute data can include end point attributes, geographical attributes, connectivity attributes, temporal attributes, etc.

At step 606, the policy controller can select an end point group for the end point based on the attribute data and a set of group selection rules.

At step 608, the policy controller can assign the end point to the selected end point group.

As one of ordinary skill in the art will readily recognize, the examples and technologies provided above are simply for clarity and explanation purposes, and can include many additional concepts and variations.

For clarity of explanation, in some instances the present technology may be presented as including individual functional blocks including functional blocks comprising devices, device components, steps or routines in a method embodied in software, or combinations of hardware and software.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, flash memory, USB devices provided with non-volatile memory, networked storage devices, and so on.

Devices implementing methods according to these disclosures can comprise hardware, firmware and/or software, and can take any of a variety of form factors. Typical examples of such form factors include laptops, smart phones, small form factor personal computers, personal digital assistants, rackmount devices, standalone devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims. Moreover, claim language reciting "at least one of" a set indicates that one member of the set or multiple members of the set satisfy the claim.

For clarity of explanation, in some instances the present technology may be presented as including individual functional blocks including functional blocks comprising devices, device components, steps or routines in a method embodied in software, or combinations of hardware and software.

Note that in certain example implementations, the optimization and/or placement functions outlined herein may be implemented by logic encoded in one or more tangible, non-transitory media (e.g., embedded logic provided in an application specific integrated circuit [ASIC], digital signal processor [DSP] instructions, software [potentially inclusive of object code and source code] to be executed by a processor, or other similar machine, etc.). The computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, flash memory, USB devices provided with non-volatile memory, networked storage devices, and so on.

Devices implementing methods according to these disclosures can comprise hardware, firmware and/or software, and can take any of a variety of form factors. Typical examples of such form factors include laptops, smart phones, small form factor personal computers, personal digital assistants, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

We claim:

1. A method comprising:
    assigning an end point in a computer network to a default end point group when the end point is initially added to the computer network;
    after the end point has been added to the computer network, gathering attribute data related to the end point;
    determining, based on the attribute data and a set of group selection rules, a target end point group; and
    assigning the end point to the target end point group.

2. The method of claim 1, wherein the attribute data includes a MAC address of the end point.

3. The method of claim 1, wherein the attribute data includes an amount of network traffic associated with the end point.

4. The method of claim 1, wherein the attribute data includes a guest operating system associated with the end point.

5. The method of claim 2, wherein determining the target end point group comprises:
   comparing the MAC address of the end point to a list of MAC addresses included in the group selection rules to identify a matching MAC address, wherein the list of MAC addresses corresponds to a list of end point groups; and
   identifying an end point group from the list of end point groups that corresponds to the matching MAC address, wherein the target end point group is the end point group that corresponds to the matching MAC address.

6. The method of claim 1, wherein the default end point group is an untrusted group and the target end point group is a trusted end point group.

7. The method of claim 1, wherein the default end point group a single port group within the computer network.

8. A policy controller comprising:
   one or more computer processors; and
   a memory containing instructions that, when executed, cause the policy controller to:
      assign an end point in a computer network to a default end point group when the end point is initially added to the computer network;
      after the end point has been added to the computer network, gather attribute data related to the end point;
      determine, based on the attribute data and a set of group selection rules, a target end point group; and
      assign the end point to the target end point group.

9. The policy controller of claim 8, wherein the attribute data includes a MAC address of the end point.

10. The policy controller of claim 8, wherein the attribute data includes an amount of network traffic associated with the end point.

11. The policy controller of claim 8, wherein the attribute data includes a guest operating system associated with the end point.

12. The policy controller of claim 9, wherein determining the target end point group comprises:
   comparing the MAC address of the end point to a list of MAC addresses included in the group selection rules to identify a matching MAC address, wherein the list of MAC addresses corresponds to a list of end point groups; and
   identifying an end point group from the list of end point groups that corresponds to the matching MAC address, wherein the target end point group is the end point group that corresponds to the matching MAC address.

13. The policy controller of claim 8, wherein the default end point group is an untrusted group and the target end point group is a trusted end point group.

14. The policy controller of claim 8, wherein the default end point group a single port group within the computer network.

15. A non-transitory computer-readable medium containing instructions that, when executed by one or more computer processors of policy controller, cause the policy controller to:
   assign an end point in a computer network to a default end point group when the end point is initially added to the computer network;
   after the end point has been added to the computer network, gather attribute data related to the end point;
   determine, based on the attribute data and a set of group selection rules, a target end point group; and
   assign the end point to the target end point group.

16. The non-transitory computer-readable medium of claim 15, wherein the attribute data includes a MAC address of the end point.

17. The non-transitory computer-readable medium of claim 15, wherein the attribute data includes an amount of network traffic associated with the end point.

18. The non-transitory computer-readable medium of claim 15, wherein the attribute data includes a guest operating system associated with the end point.

19. The non-transitory computer-readable medium of claim 16, wherein determining the target end point group comprises:
   comparing the MAC address of the end point to a list of MAC addresses included in the group selection rules to identify a matching MAC address, wherein the list of MAC addresses corresponds to a list of end point groups; and
   identifying an end point group from the list of end point groups that corresponds to the matching MAC address, wherein the target end point group is the end point group that corresponds to the matching MAC address.

20. The non-transitory computer-readable medium of claim 15, wherein the default end point group is an untrusted group and the target end point group is a trusted end point group.

* * * * *